Oct. 19, 1965   J. W. MARSHALL   3,212,170
ARMATURE AND METHOD OF MAKING THE SAME
Filed April 28, 1961   5 Sheets-Sheet 1
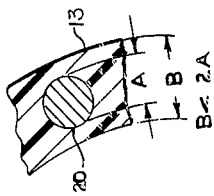
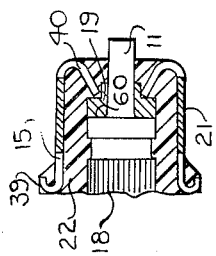
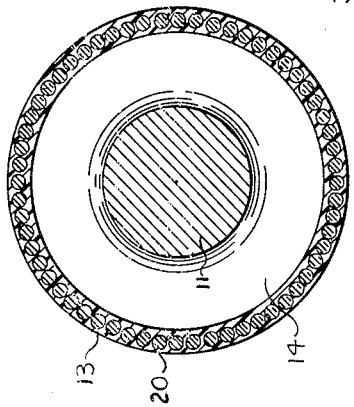
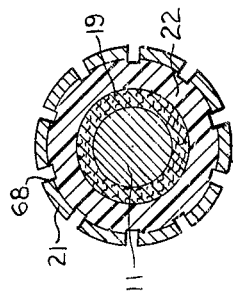
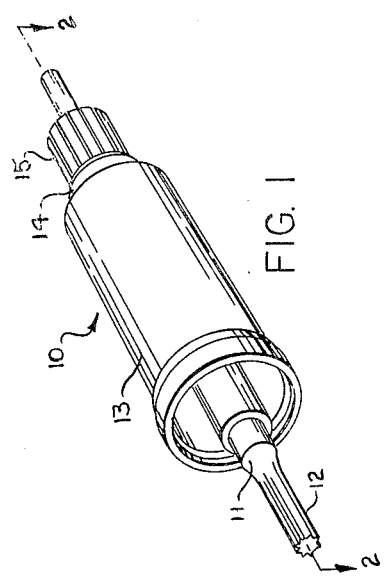
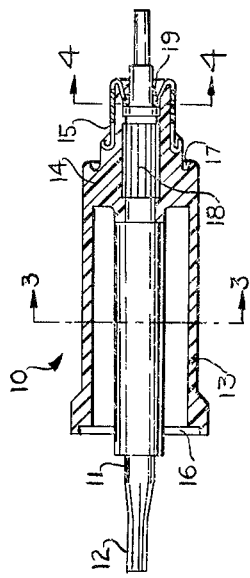
INVENTOR.
JAMES W. MARSHALL
BY Leonard Bloom
ATTORNEY

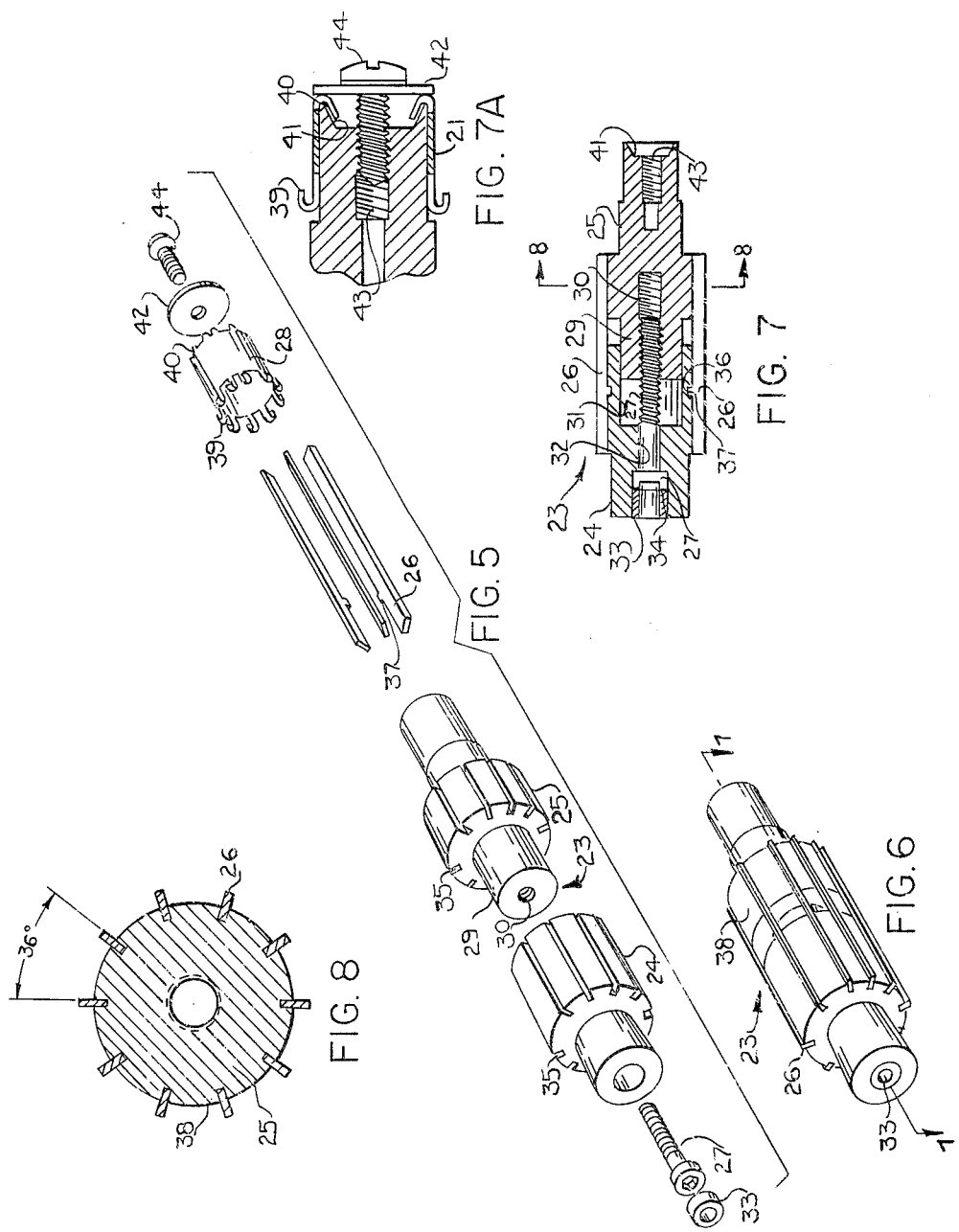

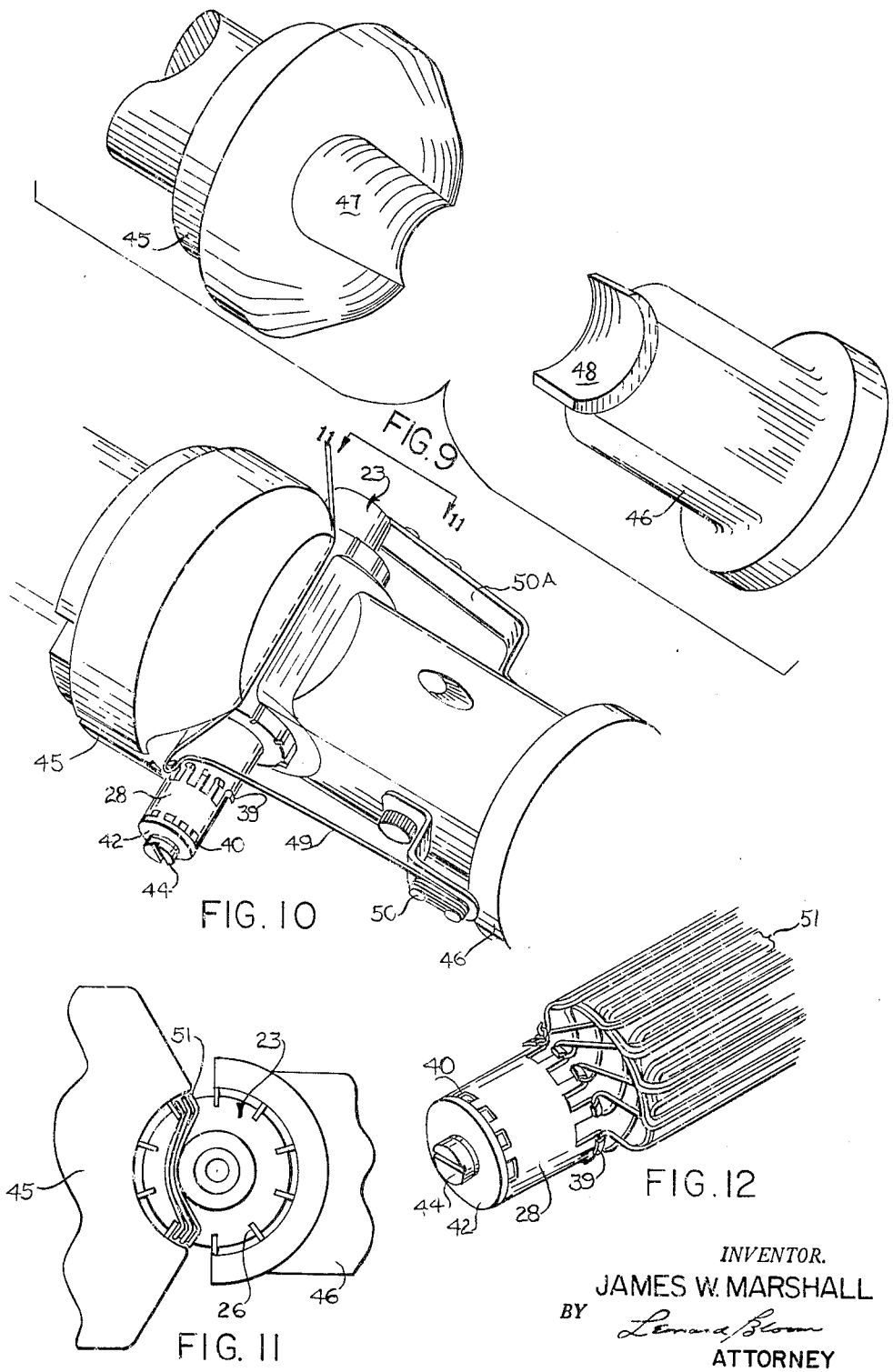

Oct. 19, 1965    J. W. MARSHALL    3,212,170
ARMATURE AND METHOD OF MAKING THE SAME
Filed April 28, 1961    5 Sheets-Sheet 4

*INVENTOR.*
JAMES W MARSHALL
BY
*Leonard Bloom*
ATTORNEY

Oct. 19, 1965   J. W. MARSHALL   3,212,170
ARMATURE AND METHOD OF MAKING THE SAME
Filed April 28, 1961   5 Sheets-Sheet 5

INVENTOR.
JAMES W. MARSHALL
BY
ATTORNEY

United States Patent Office 3,212,170
Patented Oct. 19, 1965

3,212,170
ARMATURE AND METHOD OF
MAKING THE SAME
James W. Marshall, Baltimore, Md., assignor to The
Black and Decker Manufacturing Company, Towson,
Md., a corporation of Maryland
Filed Apr. 28, 1961, Ser. No. 106,398
5 Claims. (Cl. 29—155.53)

The present invention relates to a hollow cylindrical molded armature, and to the method of making the same, and more particularly, to such an armature as may be used in the co-pending Bennett et al. application S.N. 102,705, filed April 13, 1961, now Patent No. 3,102,964 entitled "High-Efficiency Permanent Magnet Motor," assigned to the assignee as the present invention, and issued on September 3, 1963 as U.S. Patent 3,102,964.

Introduction

In the prior art, of which I am aware, hollow cylindrical lamination-free molded armatures are made, generally, in the following manner: one, the coils are each individually and separately wound using relatively-fine insulated magnet wire, the finished form of the coil usually being annular; two, the annular coils are then placed in a form and are physically bent or folded so as to have a pair of parallel sides joined at one end by respective parallel transverse members, and joined at the other end by respective outwardly-flared arcuate end turns, each of the end turns being bent by a certain pre-determined required amount; three, the coils are stacked in a cylindrical form so that the coils are partially-overlapped with respect to each other; four, a commutator having lead-connecting elements is provided, and the leads from the coils are joined to the respective elements on the commutator; five, the stacked coils and the interconnected commutator, together with a suitable armature shaft, are loaded in a suitable encapsulating mold such that the armature shaft is disposed concentrically within the stacked coils and commutator; six, the stacked coils, the leads from the windings to the commutator, and the annular space between the commutator and the armature shaft, are encapsulated or molded by means of a suitable plastic material; and seven, the commutator is slotted to form respective commutator bar segments. Such a method is described more particularly in the prior art French Patent No. 894,422, issued to Nachfolger and published on December 22, 1944, as well as in the later German Patent 1,021,466 issued to Dunker and published on December 27, 1957.

This prior art method, as outlined above, suffers from a number of deficiencies, prominent among which are the following: one, it is necessary to employ a press or form in order to bend the annular coils to the required shape, and as illustrated in the above mentioned Dunker patent, such a form is complicated, expensive to build, and unwieldly to operate; two, because of the ultimate desired configuration of the stacked coils, it is necessary that the end turns for some of the coils be formed to different arcuate shapes, thus requiring considerably more time, and further requiring the services of a skillful press operator; three, when the coils are stacked together, the staggered end turns invariably flare out appreciably from the hollow cylindrical part of the completed winding, thus resulting in an undesirably large-diameter unduly-long flange or collar portion on the finished armature, which then interferes with the efficiency and output of the motor; four, it is difficult to separate the coil leads and to connect the respective leads from the coils of the stacked winding to the respective elements on the commutator, inasmuch as the completed stacked winding interferes with the lead connections; five, the procedure for stacking the coils and compressing the coils into the final form usually requires the conjunctive use of a fixture and press, which increases the manufacturing time and cost; six, the use of relatively-fine insulated magnet wire results in a series of coils wherein the individual turns of each coil fail to lay side-by-side and often may become interwoven and entwined with each other, thus necessitating a proportionally-larger wall thickness on the hollow cylindrical molded portion of the armature, and thus requiring a proportionally-larger air gap in the motor construction, which reduces motor efficiency and output; seven, if on the other hand, relatively-thick magnet wire is used, then the thicker wires are stiffer, and the repeated operations of bending, forming, stacking, and compressing of the coils are proportionally more difficult to perform; and eight, in general, the whole procedure of the prior art is time-consuming, costly, and not susceptible either of high-speed low-cost production, or of an armature subassembly suitable for a highly-efficient relatively high-output direct current electric motor.

Objects

Accordingly, it is the general object of the present invention to provide a method of making a hollow cylindrical molded armature that alleviates the aforementioned deficiencies.

It is another object of the present invention to provide a molded armature subassembly having a hollow cylindrical molded portion, wherein the individual turns of the coils are all substantially parallel and lay side-by-side, and wherein the wall thickness of the hollow cylindrical molded portion is less than twice the diameter of the relatively-thick magnet wire used in the coils.

These and other objects of the present invention will become apparent from a reading of the following specification, taken in conjunction with the enclosed drawings, in which:

Description of drawings

FIGURE 1 is a perspective view of the completed hollow cylindrical molded armature;

FIGURE 2 is a longitudinal section of the completed armature, taken along the lines 2—2' of FIGURE 1;

FIGURE 2a is a view of an enlarged portion of FIGURE 2, showing the positioning of the molded commutator;

FIGURE 3 is a view taken along the lines 3—3' of FIGURE 2, showing the individual wires of the coil turns lying side-by-side and parallel to each other;

FIGURE 3a is an enlarged portion of FIGURE 3, showing the relationship between the wire thickness and the wall diameter;

FIGURE 4 is a view taken along the lines 4—4' of FIGURE 2;

FIGURE 5 is an exploded perspective view of the winding form or mandrel, showing a relationship of the commutator shell to be supported thereon;

FIGURE 6 is a perspective view of the assembled mandrel, the commutator shell being deleted for ease of illustration;

FIGURE 7 is a longitudinal section of the assembled mandrel, taken along the lines 7—7' of FIGURE 6;

FIGURE 7a is a view of an enlarged portion of FIGURE 7, the commutator shell being added to show its positioning on the mandrel;

FIGURE 8 is a view taken along the lines 8—8' of FIGURE 7;

FIGURE 9 is an exploded perspective view of a suitable winding mold, including a headstock and a tailstock;

FIGURE 10 shows the positioning of the mandrel in the winding mold, and further showing the starter lead;

FIGURE 11 is a view taken along the lines 11—11 of FIGURE 10, showing the winding of the first coil on the mandrel, the indexing element for the mandrel being omitted for ease of illustration;

FIGURE 12 is a partial perspective view of the completed winding on the mandrel, showing the interconnection between the coils and the tangs on the commutator shell;

Description of the armature

Figure 13:
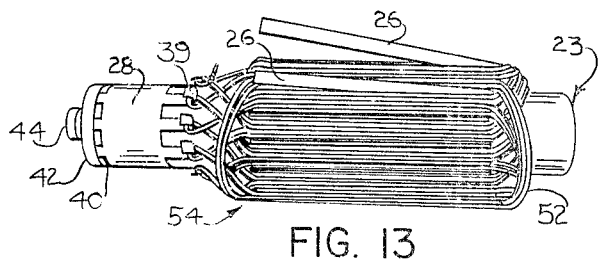
FIGURE 13 is a side elevational view of the completed winding on the mandrel, showing the coil separating blades being removed from the mandrel.

With reference to FIGURES 1 and 2, there is illustrated a completed hollow cylindrical molded armature subassembly 10, having an armature shaft 11, a pinion 12 formed on the end of the shaft 11, a molded hollow cylindrical portion 13, a closed portion 14 molded to the shaft 11, and a slotted commutator 15; and with particular reference to FIGURE 2, the armature 10 has annular grooves 16 and 17 for purposes of placing balancing weights therein, while the shaft 11 has a knurled portion 18 to facilitate the molding process hereinafter described in detail. Also, with reference to FIGURE 2a, there is illustrated an insulated washer 19, which may be made of fiber, and which is used to axially locate the commutator shell (in the molding process hereinafter to be described) and of course, to insulate the commutator 15 from the armature shaft 11.

With reference to FIGURES 3 and 3a, there is illustrated a plurality of individual wires, one of which is denoted by 20; and it will be appreciated from an examination of FIGURES 3 and 3a that first, the wires 20 (for the turns of the coils) are all substantially parallel to each other and lay side-by-side, and secondly, that the thickness of the wall section, denoted by A, is less than twice the diameter of the individual wires 20, the latter dimension being denoted by B. Thus, the wall thickness A of the hollow cylindrical portion 13 of the armature 10 is kept as small as possible, with the result that the air gap in the motor utilizing the armature 10 will be kept to a minimum; and hence, the armature 10 will facilitate optimum efficiency and output of the motor. Moreover, in the particular embodiment chosen herein to illustrate the teachings of the present invention, there are ten coils, of three turns each, resulting in a total of sixty individual wires 20; but it will be appreciated, of course, that the scope of the present invention is not necessarily confined thereto, but rather, encompasses other combinations of coils and turns per coil, just as long as the individual wires 20 are substantially parallel to each other and lay substantially side-by-side.

With reference to FIGURE 4, there is illustrated the fibre washer 19 as well as the commutator 15 with its individual bar segments, one of which is denoted by 21; and it will be further appreciated from an examination of FIGURE 4 that the annular space 22 between the commutator 15 and the washer 19 (as well as between the commutator 15 and shaft 11) is molded so as to permanently retain the commutator 15.

The method of making the armature

With reference to FIGURE 5, there is illustrated a suitable winding form, such as a two-piece mandrel 23, which includes members 24 and 25 of equal outer diameter, as well as a plurality of coil-separating blades, one of which is denoted by 26; and there is further illustrated in FIGURE 5, an interconnecting screw 27 for the members 24 and 25 of the mandrel 23, as well as a commutator shell 28, which may be made of a suitable material, such as copper.

With reference to FIGURES 6 and 7, there is illustrated the fully-assembled mandrel 23, without the commutator shell 28. Member 25 has a turned-down portion 29, which includes a tapped hole 30; and member 24 has a cylindrical recess 31 (complementary to portion 29 of member 25) and further has a bore 32 communicating with recess 31. Screw 27 passes down through bore 32 in member 24 to be received within tapped hole 30 in member 25, the turned-down portion 29 of member 25 being received within the cylindrical recess 31 in member 24; and hence, the members 24 and 25 may be axially adjusted relative to each other, thus making mandrel 23 axially-collapsible. Also, a tubular insert 33 is press-fitted in the counterbore 34, thus retaining the screw 27 in member 24, but allowing for the screw 27 to be manually actuated.

Moreover, with reference to FIGURES 5, 6, 7, and 8, each member of the mandrel 23 is provided with a series of longitudinal circumferentially-spaced surface slots, one of which is denoted by 35; and as shown in FIGURE 7, each of the slots 35 is provided with a keyway 36, while each of the blades 26 is provided with a corresponding key 37. The number of blades 26 correspond to the number of slots 35, and each of the blades 26 has a width which is greater than the depth of the slots. Thus, each of the blades 26 may be received within a respective one of the slots 35, the key 37 being received within the corresponding respective keyway 36; and hence, as illustrated in FIGURES 6 and 8, each of the blades 26 project radially from the mandrel 23, and the longitudinal spaces between the circumferentially-spaced blades 26 define a series of longitudinal circumferentially-spaced winding slots, one of which is denoted by 38. In the particular embodiment herein chosen to illustrate the teachings of the present invention, there are ten blades 26 (and hence, ten winding slots 38), each of the blades 26 being separated from the adjoining blades 26 by 36° as shown in FIGURE 8; but it will be appreciated that other combinations of blades 26 are equally feasible for use in conjunction with the present invention.

Moreover, with reference to FIGURES 5 and 7a, the commutator shell 28 is formed with a series of upwardly-projecting circumferentially-spaced tangs 39, at one end thereof, and a series of inwardly-projecting circumferentially-spaced tangs 40 at the other end thereof, the tangs 39 and 40 being formed so as to be circumferentially-aligned with each other; and the commutator shell 28 is positioned over the mandrel 23 such that the tangs 39 are axially-spaced inwardly from the end of the mandrel 23 and are circumferentially-aligned with the blades 26, and the other tangs 40 are disposed within a tapered counterbore 41 on member 25 of mandrel 23, while the commutator shell 28 is retained by means of washer 42, tapped hole 43 and screw 44. After the mandrel 23 has been assembled together as shown in FIGURE 6 with the blades 26 positioned therein, and with the commutator shell 28 secured to the mandrel 23 as shown in FIGURE 7a, the step in the process of making the armature 10 follows, namely, winding the complete armature coils directly on the mandrel 23, now to be described in detail.

With reference to FIGURE 9, a suitable winding mold, including a headstock 45 and a tailstock 46, is provided; and both the headstock 45 and tailstock 46 are provided with semi-cylindrical recesses 47 and 48, respectively, while one of the stocks, say tailstock 46, is power-driven by means understood by one skilled in the art.

With reference to FIGURE 10, which shows the winding mold turned ninety degrees with respect to the position of FIGURE 8, the mandrel 23 (together with the secured commutator shell 28) is chucked between headstock 45 and tailstock 46, the semi-cylindrical recesses 47 and 48, when the stocks are brought together, being complementary to the cylindrical mandrel 23; and the mandrel 23 is axially and circumferentially aligned (by the operator) with respect to the winding mold. A starting winding lead 49 is looped around one of the upwardly-projecting tangs 39 and is tied down to a convenient element (denoted generally as at 50 and carried by the tailstock 46), while the remaining portion of the lead is pulled straight and is disposed within the respective winding slot 38 on mandrel 23. The winding mold is then revolved by a certain number of revolutions (as determined from the desired number of turns per coil), the mandrel 23 turning end-over-end in the particular embodiment herein illustrated; and in the process of winding a respective coil, it will be appreciated that the wire is wound within a respective pair of winding slots as shown in FIGURE 11, thus completing a single coil. Next, the relative circumferential position of the mandrel 23 with respect to the winding mold is changed, as by maintaining the winding mold stationary and indexing the mandrel 23 circumferentially with the aid of indexing element 50a, such that the next adjacent winding slot 38 (and respective one of the commutator tangs 39) is presented. The operator then pulls the lead taut and loops the lead over the next adjacent tang 39 on the commutator shell 28; and another coil is wound in another respective pair of winding slots 38. Hence, the pulling of the leads taut, the looping of the leads over the respective commutator tangs 39, and the winding of the coils in respective winding slots 38 on the mandrel 23, is continued with the result that a series of partially-overlapped coils, one of which is denoted by 51 in FIGURE 10, is wound lengthwise on the mandrel 23; and, as illustrated more particularly in FIGURE 12, the coils 51 are joined by respective end coils 52, which are wound transversely about the mandrel 23 and on the end of the mandrel 23 opposite from the commutator shell 28. Also, the start and finish leads are connected together, as by a pig tail splice 53 shown in FIGURE 13a, and the mandrel 23 is removed from the winding mold. The coil leads are bonded to the respective commutator tangs 39, as by welding, and a suitable welding tool 63 is indicated schematically by the broken lines in FIGURE 13a. The relative sequence of these latter-mentioned steps, it will be appreciated, is not important to the overall method.

Moreover, it will be appreciated by those skilled in the art that ganged or multiple winding molds may be employed rather than a single winding mold and a single mandrel 23.

Figure 13A:
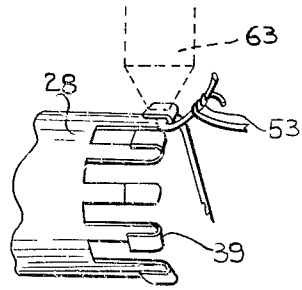
FIGURE 13a is an enlarged portion of FIGURE 12, showing the welding of the coil leads to the commutator tangs.
Figure 14:
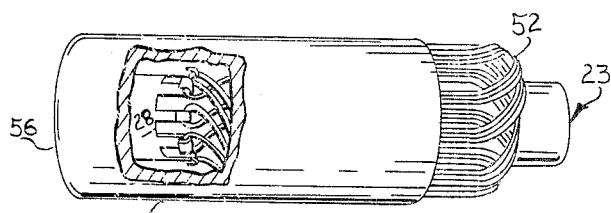
FIGURE 14 is a side elevational view of the completed winding and mandrel, being disposed within a suitable retaining cylinder such that the overlapped end turns of the coils (opposite to the commutator) are exposed, with part of the cylinder being broken away to show the interconnected commutator shell within the cylinder.
Figure 15:
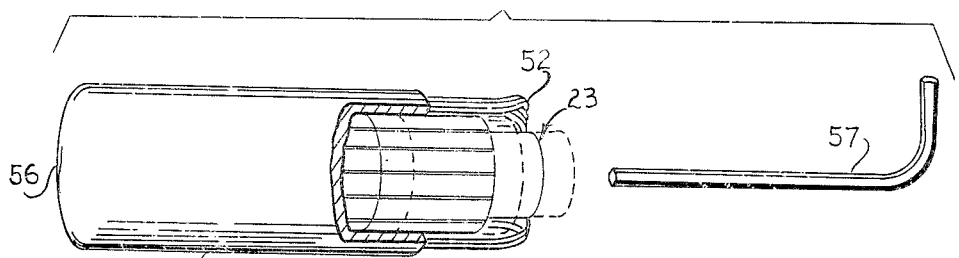
FIGURE 15 is a side elevational view of the winding, mandrel, and cylinder, with part of the cylinder broken away to show the collapsing of the mandrel, thus enabling the end turns to be folded out from the mandrel.
Figure 16:
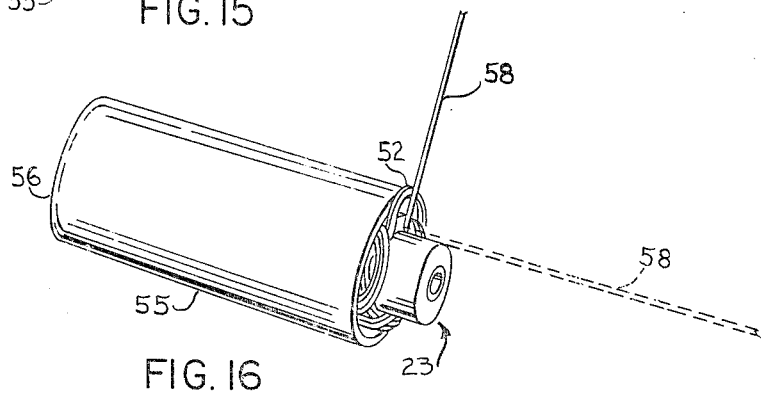
FIGURE 16 is a perspective view of the winding and mandrel (in the cylinder), showing the end turns being folded out.
Figure 17:
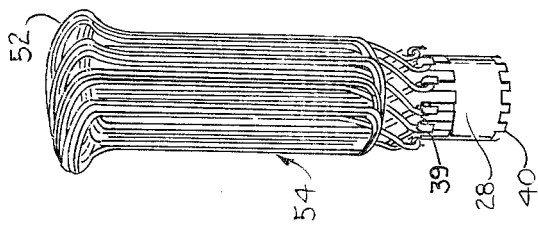
FIGURE 17 is a side elevational view of the completed winding and interconnected commutator shell, with the cylinder and mandrel removed.

The completed winding, denoted by 54 and shown in FIGURE 13 as mounted upon the mandrel 23, is next removed from the mandrel 23; and a particular series of steps for removing the completed winding 54 from the mandrel 23 is illustrated in FIGURES 14, 15, and 16. A hollow cylinder 55 is provided which has a closed end 56; and the completed winding 54 (and mandrel 23) is placed within cylinder 55, as shown in FIGURE 14, such that the commutator shell 28 is within the cylinder 55, and such that the end turns 52 of the coils (and part of mandrel 23) are exposed. With reference to FIGURE 15, the mandrel 23 is then collapsed axially, as by applying a suitable tool 57 to the head of screw 27, which draws the members 24 and 25 (of mandrel 23) axially together in a manner previously related, the adjusted or axially collapsed position of the mandrel 23 being illustrated by the full lines and the position of the mandrel 23 (prior to its being axially collapsed) being illustrated by the broken lines. Next, with reference to FIGURE 16, as permitted by the axial contraction of the mandrel, the end turns 52 are flared radially-outwardly from the mandrel 23 by applying a suitable tool, denoted by 58; next, the cylinder 55, screw 44, and washer 42 are removed, and then, the mandrel 23 is removed by sliding the completed coil over the commutator-holding part of mandrel 23, thus leaving the completed winding 54, which is shown in elevational view in FIGURE 17. Next, the hollow-cylindrical completed winding 54, as well as the respective leads to the respective commutator, are molded with a suitable material (such as plastic); and while it will be understood that a variety of molding, potting, or encapsulating techniques are contemplated as being feasible for use in conjunction with the present invention, a particular molding technique (actually an encapsulation) will now be described in more particular detail.

Figure 18:
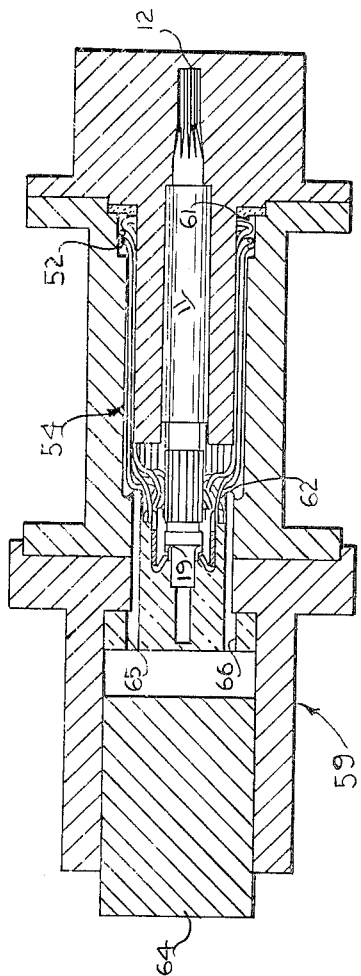
FIGURE 18 is a view of the completed winding and interconnected commutator shell, together with the armature shaft and commutator washer, loaded in a suitable encapsulating mold.

With reference to FIGURE 18, there is illustrated a suitable conventional three-part encapsulating mold 59; and the completed winding 54, interconnected commutator shell 28, and armature shaft 11 with fibre washer 19 positioned against shoulder 60 are loaded in the mold 59, in such manner that the armature shaft 11 is disposed concentrically within the completed winding 54 and interconnected commutator shell 28, with the knurled portion 18 of the shaft 11 located in position to be integrally cast or molded to the closed portion 14 of the armature 10, as hereinbefore related. The fibre washer 19 maintains the relative axial location of the commutator shell 28 prior to its being integrally cast or molded to the armature 10, as shown more clearly in FIGURE 2a. A variety of molding materials are suitable, such as an epoxy, which may be poured into a suitable mold, the mold 59 herein illustrated being in the nature of a transfer mold, but of course, various injection molding techniques and materials could be adapted for use within the scope of the present invention.

Moreover, the mold 59 is provided with annular lip portions 61 and 62, which form the previously-noted annular balancing grooves 16 and 17, respectively; and it will be appreciated that the mold 59 will usually be held in the vertical position (with the commutator portion of the armature being "up"); but having the mold 59 horizontal is also practical and may be used, if desired, just as long as the pressing piston 64 forces the molding material through the passages 65 and 66.

Figure 19:
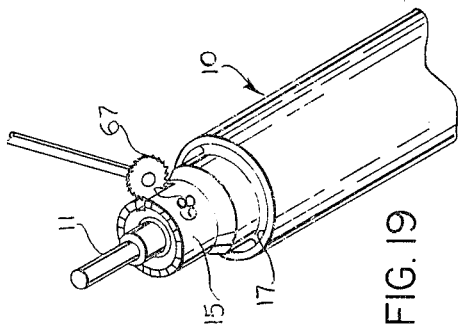
FIGURE 19 shows the slotting of the commutator shell to form individual commutator bar segments.

With reference to FIGURE 19, the previously-noted respective commutator bar segments 21 are formed on the commutator shell 28 by means of a suitable power-driven milling tool 67, which cuts longitudinal through slots 68 lengthwise of the commutator shell 28 and between the series of circumferentially-aligned tangs 39 and 40; and as shown more clearly in FIGURE 4, the slots 68 extend below the commutator shell 28 and into part of the plastic material. Also, as shown in FIGURE 2a, the inwardly-projecting tangs 40 are embedded within the molding material. Moreover, the commutator shell 28 may be turned-down prior to its being slotted, and may be finish-turned (after slotting) so as to remove any burrs.

Obviously, many modifications may be made without departing from the basic spirit of the present invention; and accordingly, within the scope of the appended claims, the invention may be practiced other than has been specifically described.

I claim:

1. The method of making a hollow cylindrical molded armature, which comprises the steps of: providing an axially-collapsible cylindrical mandrel, having a series of longitudinal circumferentially-spaced winding slots; positioning a hollow cylindrical commutator shell on said mandrel; said commutator shell having a series of circumferentially-spaced upwardly-projecting tangs at one end of the shell and a series of circumferentially-spaced inwardly-projecting tangs at the other end of the shell; securing the commutator shell over one end of the form, with the series of upwardly-projecting tangs axially-spaced inwardly and away from the one end of the form and circumferentially-aligned with the winding slots on the mandrel; chucking the mandrel in a winding mold; starting a winding lead over a respective one of the upwardly-projecting tangs on the commutator; winding a coil in a respective pair of winding slots on the mandrel; changing the relative circumferential position of the mandrel with respect to the winding mold; looping the wire from one coil to the next over the next adjacent upwardly-projecting tang on the commutator shell; winding successive coils in respective pairs of winding slots while continuing the looping of the wire between successively wound coils over the respective tangs and continuing winding of all of the coils, whereby a series of partially-overlapped coils are wound lengthwise on the mandrel, and whereby the longitudinal coil portions in the slots are joined by respective coil end turns wound transversely about and on the end of the mandrel opposite from the commutator shell; connecting the start and finish leads; removing the wound mandrel from the winding mold; securing the coil leads to the respective said upwardly-projecting tangs; collapsing the mandrel axially; folding the coil ends radially outwardly with respect to the completed winding and away from the mandrel; removing the completed winding and interconnected commutator shell from the mandrel; disposing an armature shaft symmetrically in said completed winding; loading the completed winding and interconnected commutator shell and the armature shaft in an encapsulating mold, whereby the armature shaft is disposed concentrically within the completed winding and interconnected commutator shell; molding the completed winding and the leads to the commutator shell and on the shaft with a suitable plastic material; and thereafter forming a series of longitudinal through slots lengthwise of the commutator shell, the slots being circumferentially-spaced one from another and being circumferentially-aligned with the spaces between the series of upwardly-projecting tangs, whereby respective commutator bar segments are formed.

2. The method according to claim 1, wherein an annular space is provided between the commutator shell and the armature shaft, and wherein the annular space is molded simultaneously with the molding of the completed winding and leads to the commutator shell, whereby the series of inwardly-projecting tangs is embedded in the plastic material.

3. The method according to claim 1, wherein said axially-collapsible cylindrical mandrel comprises two cylindrical members having the same outside diameter with a cylindrical recess formed in one end of one of the members and one end of the other of the members adjustably telescoped into the recess, said mandrel including a series of longitudinal circumferentially-spaced axially-fixed projecting removable blades, whereby the longitudinal spaces between the blades define the said winding slots; and wherein prior to winding, the series of upwardly-projecting tangs on the shell are circumferentially aligned with the blades, and prior to collapsing the mandrel the blades are removed from the completed winding and mandrel.

4. The method according to claim 1, including prior to loading the encapsulating mold, the further steps of: forming a shoulder on the armature shaft near one end thereof, placing an insulating washer over the one end of the shaft and abutting against the shoulder, and positioning the armature shaft concentrically within the completed winding and inter-connected commutator shell, with the series of inwardly-projecting tangs on the shell abutting against the washer and the washer positioned between the shoulder and the inwardly-projecting tangs whereby the axial position of the commutator shell relative to the shaft is determined.

5. The method according to claim 1, wherein prior to collapsing the mandrel axially and folding the end coils radially outwardly, the completed winding and interconnected commutator shell is supported in a hollow cylinder having a closed forward end with the commutator shell placed adjacent to the closed end of the hollow cylinder, and with the end coils exposed beyond the cylinder; then the end turns are folded radially outwardly while the winding is supported in the hollow cylinder, and then the hollow cylinder is removed.

References Cited by the Examiner

UNITED STATES PATENTS

| | | | |
|---|---|---|---|
| 1,813,394 | 7/31 | Fraser | 310—266 |
| 1,920,154 | 7/33 | Carlson | 29—155.5 |
| 2,095,705 | 10/37 | Kessler | 310—43 |
| 2,495,044 | 1/50 | Williams | 29—155.54 |
| 2,535,825 | 12/50 | Wahlberg | 29—155.54 |
| 2,648,018 | 8/53 | Meier | 310—43 |
| 2,759,116 | 8/56 | Glass | 310—266 |
| 2,763,052 | 9/56 | Elmer | 29—155.5 |
| 2,820,914 | 1/58 | Rudoff et al. | 310—43 |
| 3,002,259 | 10/61 | Fletcher et al. | 29—155.5 |

WHITMORE A. WILTZ, *Primary Examiner.*

JOHN F. CAMPBELL, *Examiner.*